June 2, 1970
E. G. TONN ETAL
3,515,270
PRESSURE SENSITIVE ADHESIVE COATED SEALABLE
SUBSTRATE, RESEALABLE PACKAGE EMBODYING
SAME, AND METHOD OF MANUFACTURE
AND PACKAGING
Filed Oct. 4, 1965
2 Sheets-Sheet 1
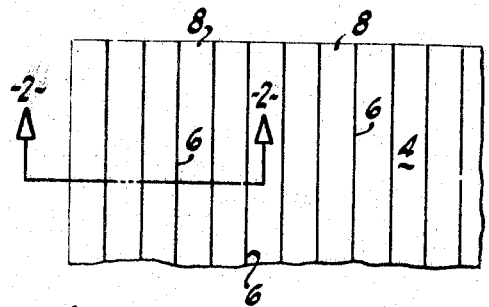
FIG-1
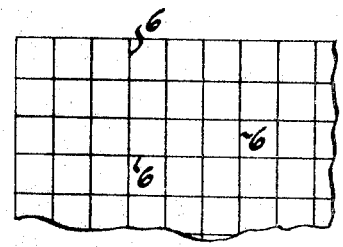
FIG-1A
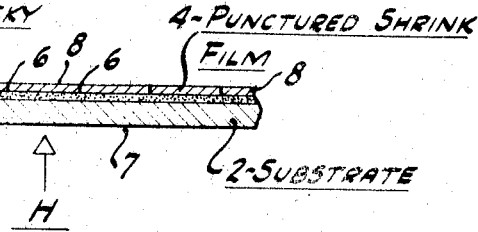
FIG-2
FIG-3
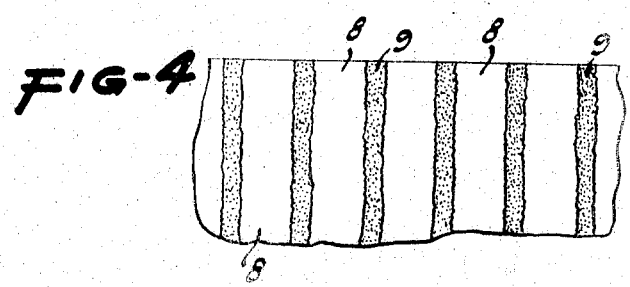
FIG-4
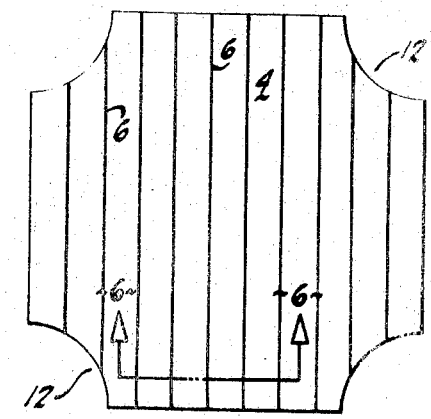
FIG-5
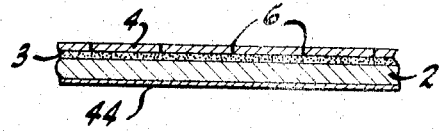
FIG-6
INVENTORS
EDWARD G. TONN
BY CHRISTEN H. C. YANG
Stanley Bielen
ATTORNEY June 2, 1970   E. G. TONN ETAL   3,515,270
PRESSURE SENSITIVE ADHESIVE COATED SEALABLE
SUBSTRATE, RESEALABLE PACKAGE EMBODYING
SAME, AND METHOD OF MANUFACTURE
AND PACKAGING
Filed Oct. 4, 1965   2 Sheets-Sheet 2
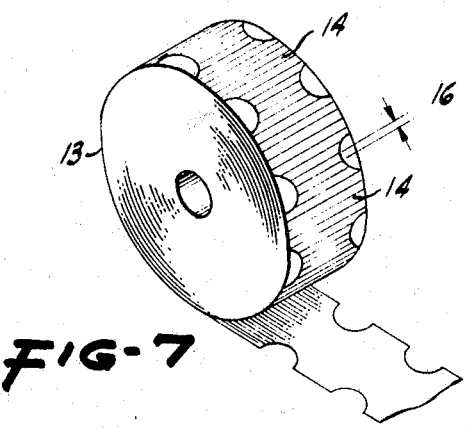
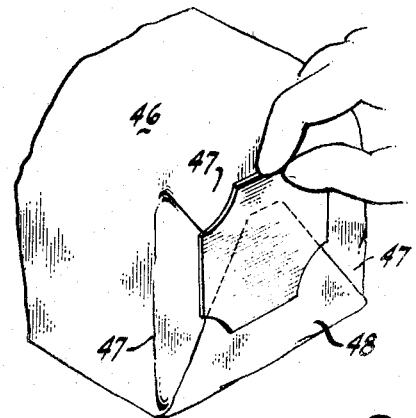
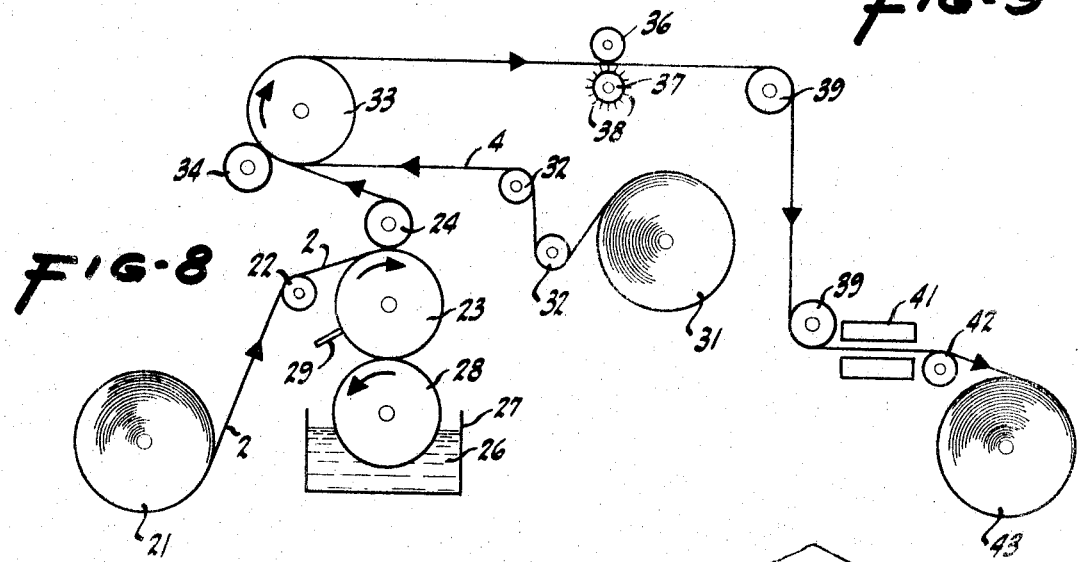
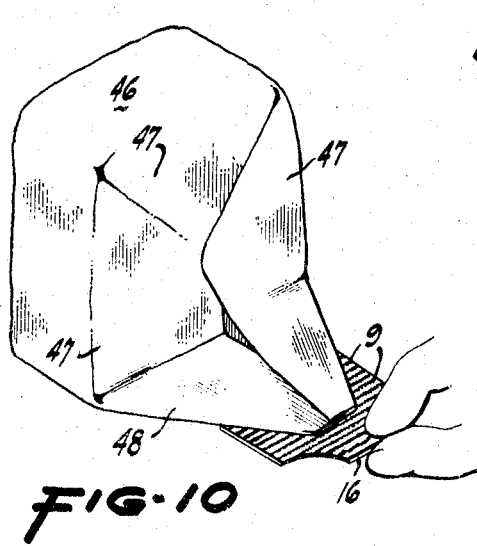
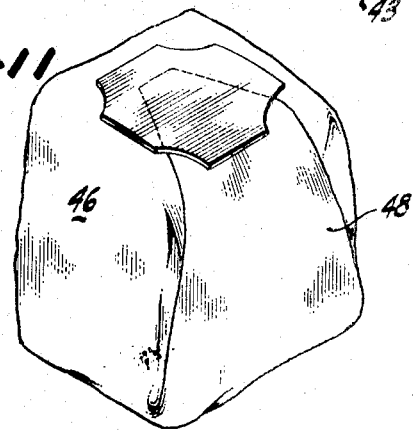
INVENTORS
EDWARD G. TONN
CHRISTEN H.C. YANG
BY Stanley Bialos
ATTORNEY

United States Patent Office 3,515,270
Patented June 2, 1970

3,515,270
PRESSURE SENSITIVE ADHESIVE COATED SEALABLE SUBSTRATE, RESEALABLE PACKAGE EMBODYING SAME, AND METHOD OF MANUFACTURE AND PACKAGING
Edward G. Tonn, Oakland, and Christen H. C. Yang, Castro Valley, Calif., assignors to Crown Zellerbach Corporation, San Francisco, Calif., a corporation of Nevada
Filed Oct. 4, 1965, Ser. No. 492,766
Int. Cl. B65b 25/16; B65d 83/08; C09j 7/04
U.S. Cl. 206—56
7 Claims

ABSTRACT OF THE DISCLOSURE

A substrate, desirably a sheet of flexible material, coated with a permanently tacky pressure sensitive adhesive coating, is rendered non-blocking by a protecting film of plastic material heat shrinkable in at least one direction. Spaced apart slits in the film extending transversely of said direction allow the film to shrink away therefrom upon application of heat, to thus expose discrete areas of the adhesive for bonding to a surface

---

This invention relates to permanently tacky pressure sensitive coated substrates adapted for sealing, and more particularly to a sealable sheet which is protected against blocking which would otherwise be caused by the pressure sensitive adhesive in a roll or stack of the sheets, and which can be employed in packaging to be repeatedly peeled from the package to enable repeated access to the contents of the package, and after such peeling can be resealed to the package to protect the contents therein.

The invention is of particular advantage in packaging of perishable food products, especially bread, wherein it is desirable to be able to remove the food contents without tearing a wrapper about the package, and then after a portion of the contents is removed, reseal the package repeatedly until all of the contents have been consumed. Although the particular embodiment of the invention illustrated by the drawings is a bread package having a conventional flexible wrapper sheet thereabout provided with the usual end folds sealed by a supplementary sealing sheet, in other words, a so-called end label, the invention is equally applicable to the packaging of other types of food products, such as cheese, bacon, cereal products, and even to the packaging of non-food products, such as writing stationary and pharmaceuticals which may be contained in paperboard cartons or the like having flaps for opening the carton and which can be resealed to a portion of the carton In the packaging of bread, it is the practice to wrap sliced loaves of freshly baked bread at the bakery in flexible wrapper sheets, such as waxed paper, cellophane, or polyolefin film, such as polyethylene and polypropylene. This is done with well known types of high speed bread wrapping equipment which forms end folds over the ends of the bread loaves which are sealed with a flexible supplementary sealing sheet in the form of a paper end label having a heat activatable flexible adhesive coating adhered by heat and pressure to the end folds of the wrapper to seal the package It is important in such type of operation that the adhesive be such that it will not block in the roll from which individual end labels are cut and applied to the wrapper end folds by high speed bread wrapping equipment, such as illustrated in Tokos et al. Pat. 3,064,403, Weida 2,349,317 and Pohl 2,409,065. If substantial blocking should occur, adjacent sheet portions in the roll will stick together as the roll is unwound, thus impeding efficient operation and proper placement of the label on the wrapper.

Various types of non-blocking heat sealable adhesives have been employed. Some of these are substantially instantaneously activatable by heat, such as disclosed in U.S. Smith Pat. No. 2,984,342. They soften upon application of heat to seal the bread wrapper end folds, but after the label has been applied, they set to a solid non-tacky coating which cannot be employed to reseal because they are only tacky again after heat has been applied thereto, and moreover their adhesive bond is so strong that they cannot be peeled from the wrapper without fiber tear.

So-called delayed tack non-blocking coatings have also been employed on paper end labels. They remain tacky after initial heat activation, for a relatively short period of time but set up relatively rapidly to a solid non-tacky state. Types of delayed tacky coatings are exemplified in the patents to Perry 2,462,209 and holt 2,678,284. Although they remain tacky for a short period of time after heat activation, their resealability is nevertheless limited.

Pressure sensitive adhesives which are permanently tacky, such as pressure sensitive adhesives employed on well known "Scotch" and similar types of tape, are ideally suited for adherence and resealability because they remain permanently tacky at ambient temperatures, and thus can be peeled and resecured to a surface to which they have been adhered. However, they present the problem of blocking. Although such blocking occurs in conventional pressure sensitive adhesive tape rolls which are used for various conventional sealing and patching purposes, such as sealing envelopes and patching tears in paper, this is immaterial because relatively short sections of the tape are pulled off by hand.

However, with rolls of pressure sensitive sealing tapes, such as end labels, the blocking prohibits use of the roll in high speed wrapping and labeling equipment of the aforementioned types. Also, the blocking is objectionable where separate sheets coated with pressure sensitive adhesive are stacked or packaged in a pile because they are hard to pull apart. Although pressure sensitive adhesive coated sealing sheets have been employed in conventional bread wrapping and labeling machines, it is necessary to utilize a specially designed slip sheet feeder for application of successive end label sections to cover the ends of wrappers about loaves of bread.

The invention hereof overcomes the aforementioned problems encountered with pressure sensitive coated, sealable substrates, such as labels. Summarizing the invention, it comprises bonding to a permanently tacky pressure sensitive coating on a substrate, a non blocking protecting sheet which is shrinkable in at least one direction upon application of heat, and which is provided with a plurality of punctured portions extending through the sheet. Upon such heat application, the protecting sheet shrinks away from the punctured portions, and thus the punctured portions become enlarged to expose discrete spaced apart areas of the adhesive therethrough.

Many types of plastic film will shrink upon heat application and are suitable for the purpose hereof. Thus, when a pressure sensitive coated flexible substrate protected by the heat shrinkable anti-blocking sheet is unwound from a roll or removed individually from stacks thereof, blocking is obviated.

In the form of bread wrapper end labels which are applied to bread wrappers by application of heat, since the permanently tacky pressure sensitive adhesive coating becomes exposed at discrete spaced areas by the shrinking of the sheet away from the punctured portions, a sealed end label can be repeatedly peeled from and resealed to the bread wrapper because the pressure sensitive adhesive remains permanently tacky. This is also true in other environments, such as in cartons where carton flaps are intended to be repeatedly opened and resealed.

From the preceding, it is seen that the invention has as its objects, among others, the provision of an improved sealable structure comprising a non-blocking protecting sheet bonded to a permanently tacky pressure sensitive adhesive coating over a substrate wherein the protecting sheet is of such structure as to expose portions of the adhesive when heat is applied, which is simple and economical to manufacture, to an improved method for making such sealable structure, and to an improved package embodying the same which can be repeatedly opened and resealed during the life of the package. Other objects of the invention will become apparent from the following more detailed description, and accompanying drawings, wherein:

FIG. 1 is a fragmentary plan view of the sealable structure hereof, looking at the face of the protecting sheet bonded to a permanently tacky pressure sensitive adhesive coatings, and illustrating punctured portions in the form of spaced razor like slits;

FIG. 1a is a fragmentary plan view similar to FIG. 1, illustrating such slits in a criss-cross pattern which is employed on certain types of protecting sheets;

FIG. 2 is a fragmentary vertical cross-section taken in a plane indicated by line 2—2 in FIG. 1;

FIG. 3 is a view similar to FIG. 2 illustrating how the pressure sensitive adhesive coating becomes exposed after shrinking of the protecting sheet by application of heat;

FIG. 4 is a fragmentary plan view looking at the shrunk sheet illustrated in FIG. 3;

FIG. 5 is a plan view of a conventional bread wrapper end label, looking at the face of the label covered by the protecting sheet;

FIG. 6 is a fragmentary vertical section taken in a plane indicated by line 6—6 in FIG. 5 and illustrating a release coating on the face of the end label opposite to the face coated with the pressure sensitive adhesive;

FIG. 7 is an isometric view of a label roll of integrally connected label sections shown in FIG. 5, from which individual labels may be separated;

FIG. 8 is a schematic view of an apparatus for simultaneously coating the substrate with pressure sensitive adhesive and protecting the same with the protecting sheet;

FIG. 9 is an isometric view illustrating an end portion of a bread package wherein a conventionally folded flexible bread wrapper is end sealed over end folds of such wrapper by a label coated on one side with exposed portions of pressure sensitive adhesive; the view depicting the label being initially peeled for opening of the package;

FIG. 10 is a view similar to FIG. 9, illustrating the label peeled from all portions of the wrapper except an outermost end fold thereof to which it remains attached during the peeling operation;

FIG. 11 is also a similar view illustrating the label resealed to the wrapper after several slices of bread have been removed from the package.

Referring to FIGS. 1 through 4, the sealable structure hereof comprises substrate or backing 2, which is of any suitable character, usually flexible paper, paperboard, metal foil, or the like. Substrate 2 is coated with any suitable pressure sensitive adhesive coating 3 which is permanently tacky at ambient temperatures and which can be of any well known type. A protecting sheet 4, which is shrinkable in at least one direction, by application of heat, is bonded to coating 3. Protecting sheet 4, is provided with relatively closely spaced punctured portions in the form of spaced slits 6, which extend therethrough in a direction transversely with respect to the shrink direction all the way across the sheet.

Slits 6 are of razor-like thinness so that under normal ambient conditions, the pressure sensitive adhesive does not become materially exposed to thereby protect against blocking when the structure is unwound from a roll with the exposed face of protecting sheet 4 in contact with the back face 7 of the substrate. Also, when sheets of the described structure are stacked, blocking is obviated so that individual sheets can be readily separated from the stack.

When heat is applied to the sealable structure, such as by application to back face 7 of substrate 2, as indicated by arrow H in FIG. 2, individual portions 8 of the heat shrinkable sheet located between slits 6, shrink away from the slit portions as shown in FIGS. 3 and 4, to thus enlarge such slit portions and expose relatively large discrete areas 9 of the permanently tacky pressure sensitive adhesive coating and render the coating useful for sealing purposes. Since the coating is permanently tacky, this enables the sealable structure to be repeatedly peeled and resealed. In the application of bread wrapper end labels by equipment of the aforementioned type, the heat is applied uniformly over the entire surface of the end label in a conventional manner by such type of equipment, causing the aforementioned shrinkage and the exposure of relatively large areas of the permanently tacky pressure sensitive adhesive.

For general sealing purposes, the character of substrate 2 is immaterial as long as the pressure sensitive adhesive will bond thereto. Likewise, the type of pressure sensitive adhesive is immaterial, as long as it will remain permanently tacky. The substrate is usually of a flexible character, such as paper, paperboard, or metal foil; and the pressure sensitive adhesive can be of any type such as a water, solvent, or hot melt base type.

With respect to the non-blocking heat shrinkable sheet 4, there are many available types, usually plastic film. They can be films formed of polyesters, polyethylene, cross-linked polyethylene, polypropylene, polystyrene, polyvinyl chloride, polyvinylidine chloride copolymers and rubber hydrochloride. It is desirable, however, that the film shrink at a temperature employed in the environment where the sealable structure is employed. For end label application to bread wrappers, rubber hydrochloride film (Pliofilm) is most suitable because such film shrinks markedly at a temperature of about 150° F. which is about the temperature employed in conventional bread equipment for the application of end labels. Twenty gauge Pliofilm having a maximum shrinkage of about 66% is advantageous for end label-bread wrapper application.

Most plastic films are conventionally made by a casting or extrusion process wherein the material for the film is caused to flow continuously in one direction onto a casting surface continuously moving in such direction, known as the "machine direction"; and upon application of heat, shrinkage will occur in such direction. Therefore, as indicated in FIGS. 1 through 3, slits 6 are formed to extend transversely of such direction.

Some films, usually those made by a blown process wherein film is expanded into a large bubble, are biaxial, namely, they will shrink in two directions transverse to each other. With such type of film, the slits 6 are formed in a criss-cross grid or grid-like pattern, as shown in FIG. 1a; and upon shrinking, a multiplicity of rectangular areas of the pressure sensitive adhesive will become exposed.

Insofar as thickness of the substrate 2 is concerned, this is relatively immaterial as long at it will transfer sufficient heat when heat is applied thereto. Also, the thickness of the permanently tacky pressure sensitive adhesive coating is relatively immaterial; the usual thickness being about 1.5 to 3.5 mils. With respect to the film thickness, it is desirable, particularly for bread wrapper end label application, that the film be as thin as possible, preferably below 1 mil (0.001 inch). If too thick, sufficient of the pressure sensitive adhesive may not bleed to the top of the film when heat is applied, thus reducing the sealing effect of the adhesive. A suitable film thickness range is between 0.1 mil to 1.5 mil with a preferred practical thickness of about 0.2 mil.

Slits 6 should be as thin as possible to minimize exposure of pressure sensitive adhesive before the protecting film is shrunk by heat application, and are therefore desirably of razor-like thinness. Slits of below 0.010 inch are satisfactory; and desirably, they should not be much wider then about 0.002 inch. They may be mechanically formed in any suitable manner such as by actual razor cuts extending through the film or by heated fine wires. In this connection, it is immaterial whether such slits happen to extend through adhesive coating 3 and a short distance into substrate 2.

Spacing of slits 6 between each other is not particularly critical; a suitable effective range being between one-sixteenth to three-eighths of an inch, and desirably about one-quarter inch. Although slits 6 are illustrated as being parallel and extending at a right angle to the shrink or machine direction of the film for the purpose of obtaining maximum effect of the shrinkage, they may run at an oblique angle to the machine direction as long as they are transverse to such direction but desirably not less than an angle of 30°. Also, the slits need not be straight parallel lines but can be wavy or curved lines if so desired. In any event, it is only necessary that sufficient fine punctured portions or areas be provided through the film to expose relatively large discrete areas of the adhesive upon the aforementioned shrinking by heat application.

U.S. Pat. 3,075,864 to Anderson discloses a wax type adhesive coating on a sealable structure, which is activatable by heat, and an unpunctured non-blocking protective film, such as polyethylene, bonded to the adhesive coating. However, to expose the adhesive coating, dependence is placed upon complete merger of the entire film with the adhesive upon application of heat. In the invention hereof, the punctured portions of the protective film make it unnecessary to depend upon complete merger which requires considerable more application of heat than in the invention hereof. U.S. Pat. 3,190,788 to Loos discloses a pressure sensitive coating and an unpunctured non-blocking heat shrinkable film bonded thereto but heat is applied only to an edge to shrink the film along such edge and thus enable the film to be pulled away from the coating of pressure sensitive adhesive.

As previously related, the invention hereof is particularly applicable in the sealing of bread wrappers by end labels. Typical bread wrapper end label paper stock is generally about 45 pounds per ream (3000 square ft.) of bleached kraft paper having the usual type of thin pigment coating, such as clay. A typical end label is shown in FIG. 5; and FIG. 7 illustrates a typical end label roll. The end label is generally provided with corner notches 12 to facilitate indexing of the label applying and wrapping apparatus in a well known manner. For application of individual labels to bread wrappers by such apparatus, the labels are supplied from a continuous parent sheet coiled in a parent roll 13 having integrally connected label sections 14 which are separated automatically from the roll into individual labels which are automatically heated, and sealed to wrapper end folds by the apparatus.

Spaced uncoated portions, indicated at 16, between the label sections 14 as disclosed in the aforementioned Smith Pat. No. 2,984,342, provide areas which are cut by the cutting means in the bread wrapping apparatus to preclude build-up of coating thereon, and thus obviate fouling of such cutting means by the adhesive. These uncoated portions 16, as shown in FIG. 10, also provide a narrow unsealed portion which may be grasped for peeling the end label from the bread wrapper end folds. In the manufacture of label rolls 13, they are first conventionally formed in a master roll of a relatively wide parent coated sheet, as shown in FIG. 2 of the aforementioned Smith Pat. No. 2,984,342, which is cut into individual label rolls.

With reference to FIG. 8, in forming the sealable sheet hereof for particular application as bread wrapper end labels, a parent substrate sheet 2 of conventional bread wrapper end label paper stock is continuously unwound from supply roll 21 in a conventional manner. It passes over guide roll 22 and through the nip between adhesive applicator coating roll 23 and back-up roll 24. A hot melt pressure sensitive adhesive composition 26 is maintained molten at a desired temperature in a conventional coating pan 27 heated in a well known manner by suitable means. A pick-up roll 28 cooperates with applicator roll 23 and continuously rotates through the molten mass 26 of coating to pick up the same from pan 27 and apply it to applicator roll 23. A conventional doctor blade 29 also cooperates with applicator roll 23 and is adjustable with reference to the periphery of the roll to aid in controlling the quantity of coating applied to substrate 2.

The non-blocking heat shrinkable film 4 is continuously unwound from roll 31 thereof, passes over guide rolls 32 and meets substrate 2 in the nip between a cool so-called chill roll 33 and laminating nip roll 34, wherein the bonding between substrate 2 and heat shrinkable film 4 is effected by the coating of the permanently tacky pressure sensitive adhesive.

From roll 33, the thus bonded sheet passes between a back up roll 36 and a rotatable slitting roll 37 having slitting members 38 which produce the razor sharp slits 6 through film 4. The slitting members are razor sharp metal knives, which are desirably heated by any suitable means (not shown) to facilitate the slitting through the plastic film. From the nip between rolls 36 and 37, the bonded slit sheet passes over guide rolls 39 and then between conventional label indexing means 41 which form the notches 12. Finally, the bonded and slit sheet passes over a guide roll 42 and is continuously wound into a master roll 43 from which individual end label rolls 13, shown in FIG. 7, are formed by slitting the master roll transversely.

A good operating speed is about 125 to 175 feet per minute, desirably about 150 feet, but this is not critical. The temperature of chill roll 33 can be room temperature, but if desired, it can be cooled in a conventional manner depending upon the particular type of pressure sensitive adhesive employed.

A suitable hot melt pressure sensitive adhesive formulation for bread wrapper end labels is as follows:

|  | Percent by weight |
|---|---|
| Elvax 40 by Du Pont (ethylene-vinyl acetate copolymer; vinyl acetate content of about 28% of the type disclosed in U.S. Patent 2,877,196) | 70 |
| Piccolastic A–50 by Pennsylvania Industrial Chemical Company (a low molecular weight polystyrene resin; average molecular weight about 350 and M.P. of about 50° C.) | 30 |
|  | 100.0 |

A suitable hot melt application temperature of the composition in coating tank 27 is in the range of 250 to 350° F., and desirably about 275° F. Such adhesive coating is applied in an amount of 30 to 50 pounds per ream (3000 square ft.) desirably about 35 lbs., of conventional bread wrapper end label paper stock of the type previously mentioned, providing a thickness of about 1.5 to 3.5 mils. The Pliofilm is desirably 20 gauge of 0.2 mil thickness having a shrinkage of about 60% in the machine direction. However, as previously indicated, particular proportions are immaterial as long as the adhesive coating remains permanently tacky and pressure sensitive.

In some environments wherein end label rolls may be stored under conditions where the temperature is relatively high, such as around 100° F. to 120° F., there may be some slight oozing of the pressure sensitive adhesive through slits 6 because the film may shrink slightly at such temperatures. Therefore, as a precautionary measure, the back side of the paper substrate 2 can be coated before the pressure sensitive adhesive is applied thereto with any suitable release coating 44 (FIG. 6) preferably of the silicone type, to insure against blocking when the label sheet is unwound from the roll. However, the release coating is not essential. Such coating should be relatively thin; an amount thereof of about 0.125 to 1.0 pound, desirably about 0.25 pound, per ream is suitable. A typical release coating has the following formulation:

|  | Percent by weight |
|---|---|
| SS–4076 by General Electric (a curable, dimethylpolysiloxane polymer) | 16.7 |
| SS–4012C by General Electric (stannous oleate-catalyst) | 0.8 |
| Solvent (mixture of 25 parts by weight methyl ethyl ketone and 75 parts by weight toluene) | 82.5 |
|  | 100.0 |

When such release coating is employed, it is applied beforehand to the end label stock by any conventional coating applicator, and the solvent is evaporated.

When the end label sheet has been formed in the end label roll, as shown in FIG. 7, it is applied by conventional bread wrapping and end label applying equipment to overlapped wrapper end folds by the heat existing in the labeling environment, namely, about 175° to 190° F.

With reference to FIGS. 9 through 11, it will be noted that loaves of fresh bread are wrapped by the aforementioned equipment with a wrapper 46, having conventional end folds over each end of the bread, with lateral and upper folds 47 underlying a lower outermost hingedly connected fold 48 When the customer desires to open the package after the label has been applied over the end folds, this can readily be done by grasping the top end of the label which has the aforementioned short uncoated portion 16, to peel the label away from the wrapper, except that portion thereof which will remain adhered to the outermost fold 48, as shown in FIG. 10, because the outermost fold being on the outside and having a hinge connection with the remainder of the wrapper will move with the label when it is pulled.

After the consumer has removed the desired amount of bread, which is usually sliced, the wrapper can be refolded over the remaining slices in the package. Inasmuch as the permanently tacky exposed pressure sensitive adhesive remains tacky, the package can be resealed or closed by refolding the wrapper over the remaining end portion of the bread, bringing what was previously the outermost fold and the label still attached thereto over the wrapper, as shown in FIG. 11, and manually pressing the label to the wrapper. This can be repeatedly done until the contents of the package have been consumed.

Although the invention is particularly illustrated in connection with a bread wrapper end label, the principle thereof is applicable in any environment as previously related, wherein it is desired to provide a repeatedly resealable substrate for adherence by a permanently tacky pressure sensitive adhesive to another body.

We claim:
1. A sealable structure comprising a substrate having a permanently tacky pressure sensitive adhesive coated on a surface thereof and a protecting sheet of plastic film bonded to said adhesive coated surface, said film being heat shrinkable in at least one direction and having a plurality of spaced apart slits extending across the same transversely with respect to said one direction, the slits being of such thinness as to preclude substantial exposure of said adhesive under normal ambient conditions, and the film being shrinkable away from said slits upon application of heat to said sealable structure to enlarge the same and expose relatively large discrete areas of said adhesive coating thus enabling said pressure sensitive adhesive to bond to a surface.

2. The sealable structure of claim 1 wherein the structure is flexible, and said slits are substantially straight and continuous.

3. The sealable structure of claim 1 wherein the substrate is a flexible sheet, and the structure is coiled in a roll having adjacent portions for separation into individual sections.

4. The sealable structure of claim 1 forming part of a package of flexible sheet material wherein a portion of the package is sealed by said structure in which the film has been shrunk away from said slits and the resultant exposed adhesive areas enable repeated removal and resealing of said structure 5. A method of laminating a sealable structure to a surface comprising applying to said surface a sealable structure comprising a substrate having a permanently tacky pressure sensitive adhesive coated on a surface thereof and a protecting sheet of plastic film bonded to said adhesive coated surface, said film being heat shrinkable in at least one direction and having a plurality of spaced apart slits extending across the same transversely with respect to said one direction, said slits being of such thinness as to obviate substantial exposure of said adhesive; the application of said sealable structure to said surface being accompanied by heat whereby said film shrinks away from said slits to enlarge the same to thus expose relatively large discrete areas of said adhesive coating, enabling said pressure sensitive adhesive coating to bond to said surface.

6. The method of claim 5 wherein the package includes a flexible wrapper therefor, and the sealable structure is applied with application of heat thereto to folds of said wrapper.

7. The method of claim 6 wherein the wrapper is about bread, and the sealable structure is a bread wrapper end label applied to end folds of said wrapper.

References Cited

UNITED STATES PATENTS

| 1,944,834 | 1/1934 | Bennett | 161—114 |
| 2,622,053 | 12/1952 | Clowe et al. | 161—115 |
| 3,073,303 | 1/1963 | Schaar. | |
| 3,259,507 | 7/1966 | Smith | 99—172 |

ROBERT F. BURNETT, Primary Examiner

ROGER H. CRISS, Assistant Examiner

FOREIGN PATENTS 915,184   1/1963   Great Britain.

U.S. Cl. X.R.

99—172; 156—85; 161—113, 114, 117, 167; 206—59; 229—87